(12) United States Patent
Lesturgie (10) Patent No.: US 8,654,002 B2
(45) Date of Patent: Feb. 18, 2014

(54) MULTISTATIC RADAR SYSTEM FOR AIRPORT MONITORING

(75) Inventor: Marc Lesturgie, Palaiseau (FR)

(73) Assignee: ONERA (Office National d'Etudes et de Recherche Aerospatiales), Chatillon (FR)

( * ) Notice: Subject to any disclaimer, the term of this patent is extended or adjusted under 35 U.S.C. 154(b) by 299 days.

(21) Appl. No.: 13/254,908

(22) PCT Filed: Mar. 4, 2010

(86) PCT No.: PCT/EP2010/052771
§ 371 (c)(1),
(2), (4) Date: Oct. 13, 2011

(87) PCT Pub. No.: WO2010/102945
PCT Pub. Date: Sep. 16, 2010

(65) Prior Publication Data
US 2012/0019407 A1 Jan. 26, 2012

(30) Foreign Application Priority Data
Mar. 9, 2009 (FR) ...................................... 09 51473

(51) Int. Cl.
*G01S 13/06* (2006.01)
*G01S 13/93* (2006.01)
(52) U.S. Cl.
USPC .................. 342/29; 342/33; 342/36; 342/126
(58) Field of Classification Search
USPC .............................. 342/29–37, 126, 146, 188
See application file for complete search history.

(56) References Cited

U.S. PATENT DOCUMENTS

| 4,516,125 A | * | 5/1985 | Schwab et al. | ................... 342/36 |
| 5,206,654 A | * | 4/1993 | Finkelstein et al. | ........... 342/410 |

(Continued)

FOREIGN PATENT DOCUMENTS

| EP | 0 550 073 A2 | 7/1993 |
| EP | 0 744 630 A2 | 11/1996 |

(Continued)

OTHER PUBLICATIONS

Feil, P. et al., "Foreign Objects Debris Detection (FOD) on Airport Runways Using a Broadband 78 GHz Sensor", Microwave Conference, 2008, EUMC 2008, 38$^{th}$ European, IEEE, Piscataway, NJ, USA, Oct. 27, 2008, pp. 1608-1611, XP031407486, ISBN: 978-2-87487-006-5 (6 pages).

(Continued)

*Primary Examiner* — John B Sotomayor
(74) *Attorney, Agent, or Firm* — Klein, O'Neill & Singh, LLP (57) ABSTRACT

The present disclosure relates to a method for monitoring targets on a runway, wherein emitting modules and receiving modules are alternately distributed along each one of longitudinal sides of the runway. Orthogonal signals are emitted in a narrowband by the emitting modules and coherently received in a coherent manner by the receiving modules. An object is detected on the runway on the basis of a distribution of the modules into meshes each including three pairs of neighbouring emitting modules and receiving modules and on the basis of a radio location of the object through triangulation and interferometry in at least one mesh. The modules are also used for analyzing a target moving on the runway, and for monitoring the trajectographies of an air target in the surroundings of the runway.

12 Claims, 4 Drawing Sheets

(56) References Cited

U.S. PATENT DOCUMENTS

| | | | |
|---|---|---|---|
| 5,268,698 A | | 12/1993 | Smith et al. |
| 5,623,267 A | * | 4/1997 | Wurman .................. 342/26 D |
| 5,629,691 A | * | 5/1997 | Jain .............................. 340/961 |
| 7,205,930 B2 | | 4/2007 | Ho et al. |
| 7,592,943 B2 | * | 9/2009 | Beasley ......................... 342/27 |
| 7,940,205 B2 | * | 5/2011 | Cornic et al. .................. 342/29 |
| 7,965,227 B2 | * | 6/2011 | Kozhevnikov et al. ....... 342/145 |
| 8,456,349 B1 | * | 6/2013 | Piesinger ....................... 342/29 |
| 2005/0140540 A1 | * | 6/2005 | Rees et al. ..................... 342/29 |
| 2006/0273950 A1 | | 12/2006 | Ho et al. |
| 2012/0019407 A1 | * | 1/2012 | Lesturgie ....................... 342/36 |

FOREIGN PATENT DOCUMENTS

| | | |
|---|---|---|
| EP | 1 712 931 A1 | 10/2006 |
| FR | 2 841 387 | 6/2002 |
| WO | WO 93/23768 | 11/1993 |
| WO | WO 2006/035199 A1 | 4/2006 |

OTHER PUBLICATIONS

International Search Report completed Apr. 30, 2010 and mailed May 7, 2010 from corresponding International Application No. PCT/EP2010/052771 filed Mar. 4, 2010 (3 pages).

* cited by examiner

MULTISTATIC RADAR SYSTEM FOR AIRPORT MONITORING

CROSS-REFERENCE TO RELATED APPLICATIONS

This is a national phase application under 35 U.S.C. §371 of PCT Application No. PCT/EP2010/052771, filed Mar. 4, 2010, which claims the benefit of French application No. 09/51473 filed Mar. 9, 2009, the contents of which are expressly incorporated herein by reference.

FIELD OF ART

The present disclosure relates to a method for monitoring targets, including targets at the level of the ground on a runway, and a multistatic radar system for implementing the method.

More particularly, it concerns a multistatic radar system for monitoring targets, including targets such as objects and aircrafts on an airport runway. The radar system is non-cooperative with the targets it monitors.

BACKGROUND

A radar monitoring system according to U.S. Pat. No. 5,268,698 includes several emitters arranged around an airport area and some receivers in the vicinity of a control tower. An aircraft or any other vehicles moving in the airport area is located by comparing signals received by the receivers with a grid of the area when it is unoccupied and by triangulation.

Another radar monitoring system is known from European patent 0,744,630. It includes radar sensors disposed along a runway and generating substantially overlapping beams. A central unit processes radar data transmitted by the radar sensors and receives via a transponder identification information regarding the aircrafts to produce a map of the runway where the locations of stationary objects, such as buildings, and aircrafts that are landing and taking off in the vicinity of the runway are identified. An intrusive threat detected in the monitored area is transmitted to the aircrafts by means of telemetry interfaces and the transponder.

European patent 0,550,073 discloses a radar monitoring system for aircrafts running in an airport area including at least three emission and reception radar stations arranged at the corners of a quadrilateral airport area and illuminating at least one sector of 90° in azimuth. For instance, through bistatic measurements of the received signals and selection of different frequencies of the emitted signals, no shade area, such as one created by a building, remains in the monitored area.

All these radar monitoring systems do not precisely locate a unidentified small object placed on a runway.

SUMMARY

The object of the present method, system and device is to overcome such a problem for improving the safety of the moving aircrafts that are to land and run on a runway. It provides non-cooperative monitoring method and system for detecting small objects on a runway, while being able to monitor a target moving on the runway, but also air targets in the vicinity of the runway.

Accordingly, a method for monitoring targets on a runway by means of emitting modules and receiving module, is characterized in that the emitting modules and the receiving modules are alternately distributed along each one of longitudinal sides of the runway and in that it includes emitting orthogonal signals by the emitting modules at a rate of at least two orthogonal signals per emitting module, a reception coherent with the emission of signals received by the receiving modules, and detecting an object on the runway based on a distribution of the modules into meshes each including three neighbor pairs of emitting module and receiving module and on a radio location of the object through triangulation and interferometry in at least one mesh.

The emitting modules and the receiving modules have stationary omnidirectional antennas and a priori, all the directions in the space are monitored by the radar system of the present method, system and device allowing it to periodically monitor, for instance every 0.1 s, the runway and its accesses as well as the surroundings above the runway, as will be set forth below. Consequently, any dangerous object on the runway, such as aircraft fragments, and any suspect move, such as a trajectory deviation, is detected.

The emission of orthogonal signals by the emitting modules, as emission signals having different monochromatic frequencies two by two and particularly relatively low ones of the order of about ten to about one hundred megahertz, at a rate of at least two orthogonal signals per emitting module, provides a useful narrowband of the system having a width of a few tens to a few hundred kilohertz and thus lower than those of known radar systems, and a slowly changing and coherent reflection by the environment. Monitoring the runway through a meshing of the emitting modules and receiving modules spaced several meters apart and alternating along the runway advantageously allows a low power of the modules and a low cost of the modules. For instance, in a mesh, each one of the three emitting modules is aligned with a respective receiving module amongst three, substantially orthogonally to the longitudinal axis of the runway.

In order to minimize the coupling of direct path between the emitting module and the receiving module of each pair and thereby to improve the near field detection on the runway, the method provides three types of processing for the received signals, which can be cumulated.

According to a first processing, the method includes emitting signals in part at a first linear polarization and in part at a second linear polarization orthogonal to the first polarization from each emitting module, and detecting an object includes periodically for each bistatic pair of emitting module and receiving module in a mesh, a polarimetric analysis of components according to the first and second polarizations of the signals received by the receiving module of the pair and issued from the orthogonal signals at the first and second linear polarizations emitted by the emitting module of the mesh.

According to a second processing, detecting an object includes periodically for each mesh, coherently subtracting a pre-stored free state of the runway from a current state of the runway derived from a processing of the signals received by the receiving modules of the mesh.

According to a third processing, detecting an object includes periodically for each mesh, determining a covariance matrix of an interferometric multistatic matrix of the signals received by the receiving modules in the mesh and building a matched filter depending on the covariance matrix for filtering the signals by the receiving modules in the mesh.

The signals received by the receiving modules are also used for monitoring targets moving on the runway. The monitoring method can then include analyzing a target moving on the runway, based on the distribution of the modules in the meshes, on a periodic analysis of the signals received by a front part of each receiving module through the runway, and on a periodic measurement of the variation of the efficient radar cross section of the target moving on the runway in the vicinity of bistatic axes of three pairs in a mesh substantially concurrent at the centre of the mesh.

The signals received by the emitting modules are also used for monitoring air targets in the surroundings of the runway. The monitoring method can then include monitoring a trajectography for an air target in the surroundings of the runway based on a periodic location of the air target through a multistatic interferometry of the signals received by the receiving modules in a three dimension space corresponding to the coordinates of the position of the target by ignoring the Doppler effect, and through a combination of a processing of a multistatic matrix of the received signals and of the diversity of the Doppler effect.

The present method, system and device also provide a system for monitoring targets on a runway by means of emitting modules and receiving modules. The system is characterized in that the emitting modules and the receiving modules are alternately distributed along each one of the longitudinal sides of the runway, the emitting modules being able to emit orthogonal signals at a rate of at least two orthogonal signals per emitting module, and in that the system includes means for receiving signals in the receiving modules coherently with the emission of signals by the emitting modules, and means for detecting an object on the runway based on a distribution of the modules in meshes each including three neighbor pairs of emitting module and receiving module and on a radio location of the object through triangulation and interferometry in at least one mesh.

The monitoring system can further include means for analyzing a target able to move on the runway based on previously mentioned method steps, and means for monitoring the trajectography of an air target in the surroundings of the runway based on previously mentioned method steps.

Finally, the present method, system and device relate to a computer program adapted to be implemented in a monitoring system according to the present disclosure, said program including instructions that carry out the steps according to the monitoring method of the present disclosure when the program is executed in said system.

BRIEF DESCRIPTION OF THE FIGURES

Other features and advantages of the present method, system and device will become more clearly apparent on reading the following description of several embodiments of the present method, system and device given by way of nonlimiting examples and with reference to the corresponding appended drawings in which.

DETAILED DESCRIPTION

Figure 1:
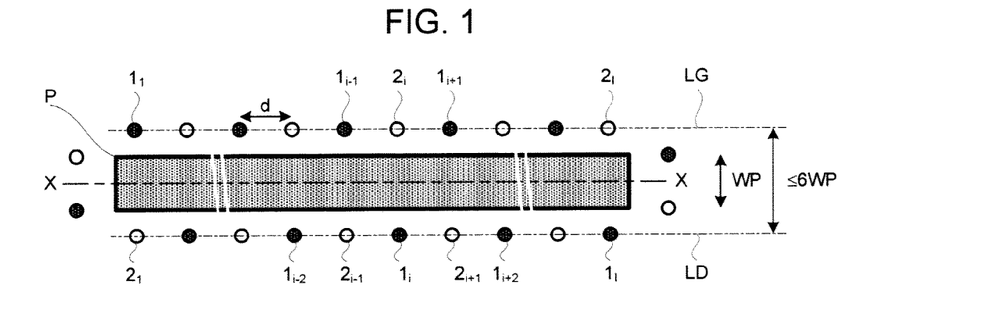
FIG. 1 is a top view of a runway surrounded by emitting modules and receiving modules of a multistatic radar monitoring system according to the present disclosure.

With reference to FIG. 1, a multistatic radar monitoring system includes a plurality of emitting modules $1_1$ to $1_I$ and a plurality of receiving modules $2_1$ to $2_I$ equi-distributed along the longitudinal sides of a landing and take-off runway P in an airport. A few emitting modules and receiving modules can be arranged at the ends of the runway. The radar system further includes a signal distributing and processing centre 3 shown on FIG. 2, in which only one emitting module $1_i$ and one receiving module $2_i$ are shown as block diagrams, with $1 \le i \le I$.

The modules can be buried at least partially and are fastened in the ground at a distance from the longitudinal edges of the runway P at the most equal to about 3 WP for a width WP of the runway. The distance 3 WP is determined for reducing the risks of damage caused by an aircraft incidentally running on the edges of the runway. For example, for a runway having a width of 45 m, the emitting modules and the receiving modules are arranged on the edges of the runway alternately on each one of two lines LG and LD parallel to the runway P, at a distance at the most of 75 m from the longitudinal axis XX of the runway. Each emitting module $1_i$ on one of the parallel lines LG and LD is aligned with a respective receiving module $2_i$ on the other parallel line following a bistatic axis orthogonal to the axis XX. As a function of airport constraints, the modules are arranged on two rectangular obstacle free zones OFZ along the longitudinal sides of the runway and having a width of 37.5 m, or on two rectangular arranged strips extending between 60 m and 75 m from the axis XX. Other emission modules and receiving modules are fastened in rectangular areas adjacent to the longitudinal ends of the runway and having a width ranging between about 1 WP and about 2 WP. The emitting modules $1_1$ to $1_I$ and the receiving modules $2_1$ to $2_I$ are evenly distributed along the sides of a rectangle surrounding the runway and having common axes with the latter. According to the previous example of a runway, two neighbor modules on the rectangle surrounding the runway are spaced a distance of about 150 m apart. For instance, for a 4 km long runway, the radar system includes more than about fifty emitting modules and receiving modules.

Figure 2:
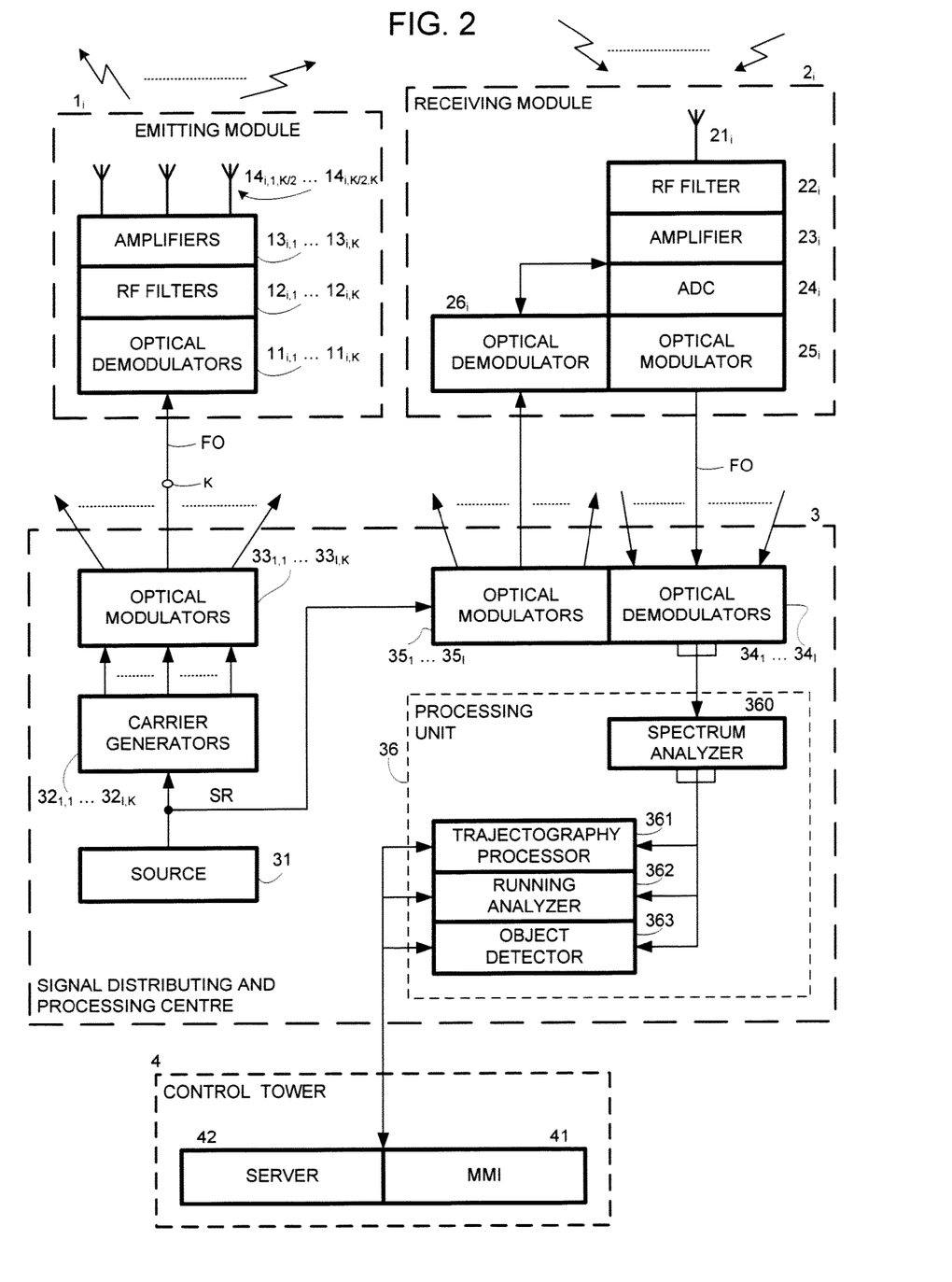
FIG. 2 is a block diagram of the radar system according to the present disclosure.

As shown on FIG. 2, the signal distributing and processing centre 3 includes an emission signal source 31, I×K carrier generators $32_{1,1}$ to $32_{I,K}$ and I×K optical modulators $33_{1,1}$ to $33_{I,K}$ for respectively distributing I groups of K signals to be emitted respectively by the emitting modules $1_1$ to $1_I$, I optical demodulators $34_1$ to $34_I$ and I optical modulators $35_1$ to $35_I$ and a received signal processing unit 36 for processing the signals received by the receiving modules $2_1$ to $2_I$. According to the illustrated embodiment, the centre 3 is linked to the emission and receiving modules by bundles of optical fibers FO, at a level of K optical fibers by emitting module $1_i$ and 1 to 2 optical fibers by receiving module $2_i$. The bundles of optical fibers help to secure signals exchanged between the centre 3 and the modules $1_1$ to $1_I$ and $2_1$ to $2_I$ so that they are not disturbed by interfering signals.

Figure 3:
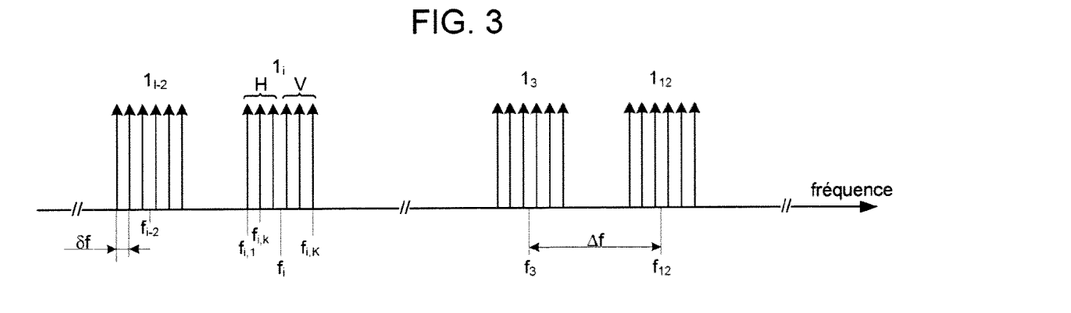
FIG. 3 shows the emission spectrum of the radar system for groups of carriers respectively associated with some emitting modules.

The source 31 is a source of low noise of the type including a quartz or an atomic clock and delivering a common reference signal SR applied to the carrier generators $32_{1,1}$ to $32_{I,K}$. Each group of K generators $32_{i,1}$ to $32_{i,K}$, such as for instance frequency synthesizers, generates K monochromatic carriers $f_{i,1}$ to $f_{i,K}$ intended for a respective emitting module $1_i$, for instance in the number of K=6. The I×K carriers have different frequencies therebetween and are distributed as shown on FIG. 3. The frequencies $f_{i,1}$ to $f_{i,K}$ associated with an emitting module $1_i$ are spaced an interval δf of the order of 40 Hz to 100 Hz apart and occupy a narrow frequency band centered on a specific frequency $f_i=(f_{i,1}+f_{i,K})/2$. The frequency bands and hence, the specific frequencies $f_1$ to $f_I$ are allocated randomly or arbitrarily to the emitting modules. The frequency bands do not overlap each other. The difference Δf between the central frequencies of two successive groups of carriers is higher than the maximum Doppler frequency of a target, and is for instance approximately] 200 Hz, 1 kHz or 430 MHz for a respective frequency of the reference signal SR of 70 MHz, 4 kHz or 960 MHz. This imparts a useful total band to the radar system of the order of a few tens to a few hundreds of kilohertz. The useful total band of the radar system is thus narrow according to one of the objectives of the present method, system and device.

Each carrier generator $32_{i,k}$ is connected to a respective optical modulator $33_{i,k}$ that modulates by the respective carrier $f_{i,k}$ to be emitted an optical carrier emitted via a respective optical fiber FO to an optical demodulator $11_{i,k}$ in the respective emitting module $2_i$, with 1≤k≤K. Alternatively, the K respective optical modulators $33_{i,k}$ to $33_{i,K}$ in the centre 3, the K optical demodulators $11_{i,1}$ to $11_{i,K}$ in the emitting module $2_i$ and the K optical fibers between these modulators and demodulators are replaced by a optical transmission system WDM ("Wavelength Division Multiplexing") multiplexing K wavelengths and having one single optical fiber.

An emitting module 1, includes in parallel in addition to the K=6 optical demodulators $11_{i,1}$ to $11_{i,K}$, particularly K band pass filters $12_{i,1}$ to $12_{i,K}$ and K amplifiers $13_{i,1}$ to $13_{i,K}$ respectively associated with monochromatic carriers of frequencies $f_{i,1}$ to $f_{i,K}$ to be emitted continuously by the emitting module. The outputs of the amplifiers $13_{i,1}$, $13_{i,2}$ and $13_{i,3}=13_{i,K/2}$ and the outputs of the amplifiers $13_{i,4}$, $13_{i,5}$ and $13_{i,6}=13_{i,K}$ are respectively matched to the inputs of K/2 omnidirectional antennas with double vertical and horizontal linear cross-polarization $14_{i,1,4}$, $14_{i,2,5}$ and $14_{i,3,6}$ having small dimensions. All these components are enclosed in a casing, for instance shaped as a mushroom. As will be set forth later on, the polarization-diversity narrow-band operation of the emitting modules as well as the space diversity due to the antennas increases the sensitivity of target detection through the receiving modules by reduction of the coupling between the emitting module and a receiving module. The diversity of frequencies and polarization upon the emission improves the reception of signals reflected by small objects OB on the runway and thereby the location of the latter.

A receiving module $2_i$ includes successively an omnidirectional antenna with double vertical and horizontal cross-polarization $21_i$ so as to receive the horizontal and vertical components of a backscattered signal issued from each signal emitted with a horizontal or vertical polarization, a band-pass filter $22_i$, an amplifier $23_i$, an analog-to-digital converter $24_i$, an optical modulator $25_i$ linked to the respective optical demodulator $34_i$ in the centre 3 through an optical fiber, and an optical demodulator $26_i$ linked to the respective optical modulator $35_i$ in the centre 3 through another optical fiber. The band-pass filter $22_i$ has a narrow frequency band covering at the most the frequency bands of the carriers emitted by the emitting modules. The mixed signals received from the emitting modules are digitalized in the converter $24_i$ at a low sampling frequency as the passband of the filter $22_i$ is narrow. Typically for a emission power of the order of the watt in each emitting module, one 12-bit analog-to-digital converter $24_i$ is sufficient for precisely covering the variations of reception power due to the target detection. The total power radiated by all the modules of the radar system is in general lower than 100 W. In the centre 3, the respective optical demodulator $34_i$ recovers the mixed received signals for being frequently analyzed by the unit 36 in order to characterize the different flight phases of an aircraft from the approach up to the running on the runway, as will be described below. The reception being coherent, the optical demodulator $26_i$ of each receiving module $2_i$ receives via the respective optical modulator $35_i$ a time and frequency reference common signal depending on the reference signal SR provided by the source 31 and used for synchronizing all the receiving modules with the synchronous emissions of the emitting modules.

Alternatively, the two optical fibers linking the receiving module $2_i$ and the centre 3 are replaced by one single bidirectional optical fiber.

The emitting modules and the receiving modules are electrically supplied for example through buried electric wires linked to the electric network of the lights of the runway and optionally of the taxiway as the power necessary for their operation is of a few kilo-volt-amperes.

According to the illustrated embodiment, the bundles of optical fibers FO, the optical modulators $33_{1,1}$ to $33_{I,K}$, the demodulators $34_1$ to $34_I$ and the modulators $35_1$ to $35_I$ in the centre 3 as well as the optical demodulators $11_{1,1}$ to $11_{I,K}$ in the emitting modules and the modulators $25_1$ to $25_I$ and the demodulators $26_1$ to $26_I$ in the receiving modules make up an optical telecommunications network. This network can be replaced by a local area network of transmission cables, or even by a low range radio communication network of the type meeting the WiFi ("Wireless Fidelity") or WIMAX ("World wide Interoperability Microwave Access") label if the transmission safety of the signals between the centre and the modules is not restricting.

The processing of the signals received in the unit 36 is based on the coherent implementation of a multistatic scattering matrix, the dimensions of which depend on the product I×K of the number I of emitting modules by the number of specific frequencies per emitting module and the number I of receiving modules. The unit 36 is linked to a man-machine interface (MMI) 41 and to a database management server 42 in a control tower 4. According to an alternative, the server 42 is integrated into the unit 36. According to another alternative, the unit 36 with the server 42 is included in the control tower and is linked to other elements of the distributing and processing centre 3 via a local or remote link. According to still another alternative, the centre 3 optionally with the server 42 is installed in a protected room near the control tower. The interface 41 includes more specifically a desk unit with radar control stations for following up the move of aircrafts in real time and any modification of the state of the runway and selecting operation modes for the radar system. The server 42 manages more specifically information on the air traffic around the control tower useful for a mode selection and stores responses from the radar system transmitted by the unit 36, more specifically upon learning phases.

The unit 36 includes a digital spectrum analyzer 360 connected to the outputs of the optical demodulators $34_1$ to $34_I$.

The spectrum analyzer extracts from I signals received by all the receiving modules $2_1$ to $2_I$ through the optical system 25-FO-34, I×I groups having each K received signals and respectively associated with the I×I bistatic pairs of emission and receiving modules, as a priori each receiving module is able to receive signals emitted at all the I×K emission frequencies $f_{1,1}$ to $f_{I,K}$ allocated to the emitting modules $1_1$ to $1_I$. The multistatic scattering matrix is built for the bistatic pairs of modules as a function of the I²×K signals received in output of the spectrum analyzer. The I×I groups of received signals are applied to the inputs of three processing modules 361, 362 and 363 included in the unit 36 of the multiprocessor type. The four elements 360 to 363 are represented as functional blocks being related to the present method, system and device and can correspond to hardware and/or software modules.

As shown on FIGS. 2, 4, 5 and 6, the operation of the radar system according to the present method, system and device is based on three monitoring modes that can be simultaneously established in the processing modules 361, 362 and 363 that are a trajectography processor 361 providing a mode M1 for monitoring the trajectography of an air target A in the vicinity of the runway, a running analyzer 362 ensuring an mode M2 for analyzing a target AR upon running on the runway and an object detector 163 ensuring a mode M3 for detecting an object OB on the runway. The processors 361, 362 and 363 are simultaneously functional in the unit 36. The monitoring modes can be selected by each operator before a station in the watch room of the control tower 4, although alternatively at least one station is dedicated to each mode.

For all the modes, the radar system operates in a passive way with respect to the targets, without cooperation with the latter and detects the echoes scattered by the air targets such as aircrafts, including those not provided with a transponder, moving in a monitoring area of for example about 15 km around the runway. The emitting modules and the receiving modules operate continuously and simultaneously. At each integration period, for example of the order of 0.1 s, all the directions of the space are refreshed and processed by the unit 36 allowing to detect any incident such as a trajectory deviation or an object on the runway. Thanks to the multistatic configuration, a defect of a few emitting modules and/or a few receiving modules generates a low alteration of the monitoring by the radar system of the present disclosure.

Figure 4:
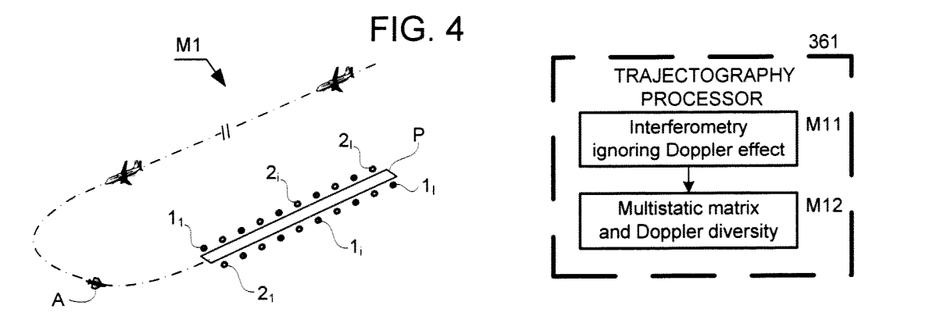
FIG. 4 shows positions of aircrafts and steps of a mode of trajectography for an air target approaching the runway according to the monitoring method of the present disclosure.

The trajectography monitoring mode M1 for following up the approach of the runway P by an air target A includes two steps M11 and M12. with reference to FIG. 4. The trajectography processor 361 collects the signals from all the receiving modules and globally processes them considering all the emitting modules for periodically detecting and trajectographying accurately each aircraft on approach by means of the K groups with I carriers of different frequencies.

As each emitting module $1_i$ continuously emits at least one monochromatic carrier, the frequency $f_{i,k}$ of which is associated with it in the processor 361, the latter associates periodically via the Fourier transform in the spectrum analyzer 360 the complex amplitude of the signal received at the frequency $f_{i,k}$ by a receiving module $2_j$ with the bistatic pair of modules $1_i$-$2_j$ and with a target position, with $1 \le i,j \le I$. The received signal depends on the bistatic distance equal to the sum of the distance emitting module $1_i$ to the target and the distance of the target to the receiving module $2_j$, of the speed of the target and its orientation with respect to the modules. The complex amplitude is measured at a complex sampling frequency higher than the double of the maximum Doppler frequency of the monitored air targets.

The ambiguous features resulting from the lacunary character of the antenna network in the radar system are removed through a less complex tracking than that known, based on a complicated maximum likelihood estimation of the three coordinates of the target position and the three coordinates of the target speed, namely 6 unknowns. At each integration period, the processor 361 estimates at step M11 the location of the air target by multistatic interferometry of the signals received by the receiving modules in a three dimension space corresponding to the target position coordinates first ignoring the Doppler effect and thus the speed of the target.

Then at step M12, the processor 361 combines the processing of the multistatic matrix of the received signals respectively associated with the bistatic pairs and with the frequencies of the emitted signals and the diversity of the Doppler effect to provide an interferometric multistatic location of the detected air targets so as to remove the location ambiguities inherent to the previous interferometry. Images of aircrafts simultaneously located in the area monitored by the radar system are separated by a reliable and unambiguous spectrum analysis distinguishing the Doppler frequencies thereof. For each term of the multistatic matrix, the processor 361 carries out an unambiguous Doppler detection. This spectrum analysis is carried out on the signals received by the antenna of each receiving module; at a large distance from the runway, the spectrum analyzes for the Doppler frequencies carried out from each bistatic pair of emitting and receiving modules are identical. This is possible in so far as the Doppler effects are different for different pairs of modules $1_i$-$2_j$. Consequently, thanks to a sufficient Doppler resolution, the processor 361 distinguishes the projections of the speed vector of the target on each direction between the latter and a receiving module. The Doppler measurement supplies an additional information helping to locate the air target. Locating aircrafts, including vertically, according to the present method, system and device is better than with a conventional radar.

In a final approach phase, the dependence on the Doppler spectrum analysis as a function of the bistatic pair of modules being considered is taken into account by the processor 361 allowing for a better observability of the position parameters of the target in the man-machine interface 4. In such a case at least, the subsequent Doppler spectrum analysis may be employed for cleaning the ambiguities of the multistatic interferometry.

Any trajectory deviation is detected.

In the presence of several targets, the process combining the processing of the multistatic matrix and the diversity of the Doppler effect for each target is additive, the multistatic matrix to be processed resulting from the sum of the multistatic matrices corresponding to the targets.

The trajectography processor 361 can also be used for following up aircrafts upon take off.

During the running target analyzing mode M2 for monitoring at least the whole running phase of an aircraft, the running analyzer 362 monitors the runway P so as to detect the aircraft, or any other vehicle, running on the runway P and to measure its speed with accuracy. The mode M2 includes steps M21 to M23, with reference to FIG. 5.

Figure 5:
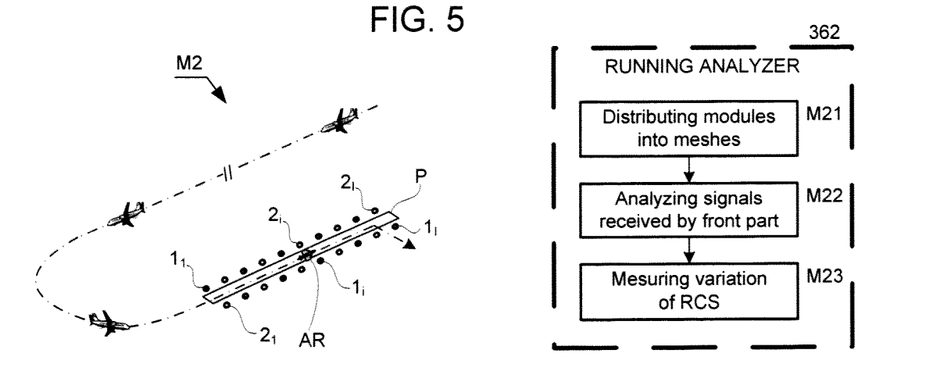
FIG. 5 shows positions of aircrafts and steps of a mode of analysis for an air target running on the runway according to the monitoring method of the present disclosure
Figure 7:
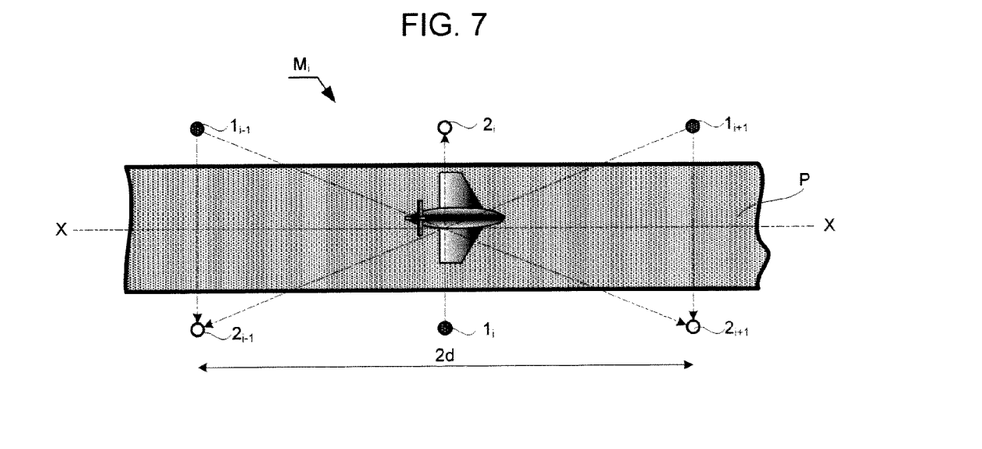
FIG. 7 shows a detail of FIG. 1 illustrating bistatic pairs of emitting module and module reception in a mesh with three emitting modules and three receiving modules of the multistatic radar system.

For analyzing aircrafts upon running, or at a few meters above the runway in a final landing or take off start phase, the analyzer 362 distributes at step M21 the emitting modules $1_1$ to $1_I$ and the receiving modules $2_1$ to $2_I$ alternately arranged on two lines parallel to the runway P into I−2 meshes superposed two to two. As shown on FIG. 7, each mesh $M_i$, with $1<i<I$. includes three bistatic pairs of emitting module and receiving module $1_{i-1}$-$2_{i-1}$, $1_i$-$2_i$ and $1_{i+1}$-$2_{i+1}$ having bistatic axes perpendicular to the runway and successively located along the runway. At least the signals received by the three receiving modules of the three bistatic pairs $1_{i-1}$-$2_{i+1}$, $1_i$-$2_i$ and $1_{i+1}$-$2_{i-1}$ in the mesh $M_i$, the axes of which are substantially concurrent at the centre of the mesh $M_i$, are used for monitoring the move of an aircraft A through evaluating the efficient radar cross section RCS of an aircraft running on the runway P, in conjunction with the coherent reception.

As according to one of the objectives of the present method, system and device, the mean emission power of an emitting module is low, of the order of the watt, the analyzer 362 ignores through filtering, for each receiving module $2_i$, the signals emitted by the emitting modules remote from the receiving module $2_i$ by more than the double $2d$ of the distance between two successive modules, such remote emitting modules having no sufficient energy balance. Each emitting module $1_i$ emits signals at close frequencies, different at the most of a few hundreds of hertz (FIG. 3), interfering according to beat frequencies at the level of the targeted aircraft. The detector 362 detects and analyzes the signals received by the modules $2_{i-1}$, $2_i$ and $2_{i+1}$ of the mesh $M_i$ for accurately locating the object OB on the runway.

Figure 8:
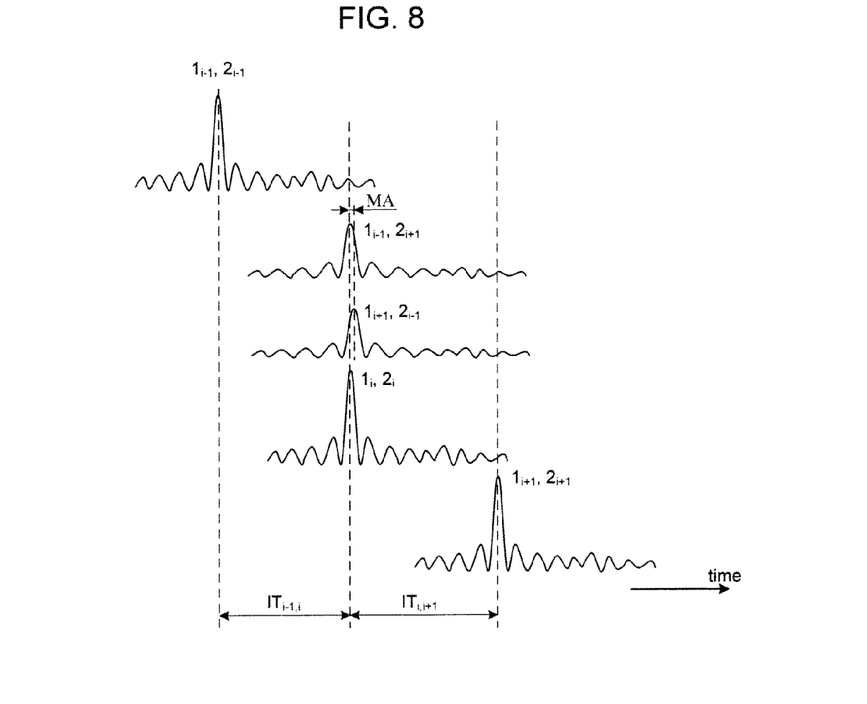
FIG. 8 is a variation graph of equivalent radar cross sections received by the receiving modules of pairs in a mesh upon an aircraft running on the runway.

Moreover, the detector 362 operates in a multistatic forward scattering radar mode FSR. At step M22, for each receiving module $2_i$, the analyzer 362 ignores through filtering the signals emitted directly by emitting modules located on the same side of the runway P, as the neighbor emitting modules $1_{i-1}$ and $1_{i+1}$, and periodically analyzes only the signals received by "the front part" of the module $2_i$ through the runway P, as the signals from the neighbor emitting modules $1_{i-2}$, $1_{i-1}$, $1_i$, $1_{i+1}$ and $1_{i+2}$. Removing the direct path signals between a receiving module $2_i$ and the neighbor emitting modules $1_{i-1}$ and $1_{i+1}$ is spatially enhanced through the alternate layout of the emission and receiving modules on each side of the runway. When the aircraft A upon running crosses both the bistatic axes of the three successive module pairs $1_{i-1}$-$2_{i+1}$, $1_i 2_I$ and $1_{i+1}$-$2_{i-1}$, the efficient radar cross section RCS extremely significantly increases, but for a very short period of time, as shown on FIG. 8. A time misalignment MA between the peaks of power received by the receiving modules $2_{i-1}$, $2_i$ and $2_{i+1}$ results from an off-centered position of the aircraft with respect to the longitudinal axis XX of the runway. The difference of widths of two time intervals $IT_{i-1,i}$ and $IT_{i,i+1}$ between the crossings of the aircraft successively through the bistatic axes of module pairs $1_{i-1}$-$2_{i-1} 1_i$-$2_i$ and $1_{i+1}$-$2_{i+1}$ is due to variations of the aircraft speed, namely a slowing down of the latter after landing. Increasing the efficient radar cross section RCS is directly linked, when the emission frequency is high, to masking and creating a shadow area behind the aircraft. The more important the shadow, the larger the cross section RCS. The alternate distribution of the emission and receiving modules along the runway allows the analyzer 362 to remove spatially amongst the signals received by each receiving module $2_i$ those that are emitted directly more specifically by the two closest emitting modules $1_{i-1}$ and $1_{i+1}$ located on the same side of the runway and being useless for locating a target at the normal to the receiving module $2_i$. The maximum of the cross section RCS is approximately equal to that of a metallic plate with a dimension equal to the cross section of the target perpendicular to the axis of the considered bistatic module pair.

At step M23, the analyzer 362 periodically measures the variation of the efficient radar cross section of an aircraft AR in the vicinity of the bistatic axes of the three bistatic pairs $1_{i-1} 2_{i+1}$, $1_i$-$2_i$ and $1_{i-1} 2_{i+1}$ in the mesh $M_i$ for deducting therefrom interesting information about the aircraft, such as the position in real time of the aircraft, the speed of the aircraft through differential measurement of the cutting times of the bistatic axis $1_i$-$2_i$ the deflection of the trajectory of the aircraft derived from a reproducibility defect of the cross section RCS of the aircraft. The analyzer 362 can also be used for more specifically measuring the cross sections of an aircraft transversally to a bistatic axis $1_i$-$2_i$ and defined by the amplitude and the width of the peak of the cross section RCS of the aircraft. The cross sections of the aircrafts and of other objects or vehicles able to be present incidentally on the runway are preferably pre-stored in the management server 42 and classified according to their sizes. Referring again to FIG. 7, signals emitted by the modules $1_{i-1}$ and $1_{i+1}$ received respectively by the modules $2_{i+1}$ and $2_{i-1}$ and simultaneously measured by the analyzer 362 have identical characteristics of cross section RCS when the aircraft is aligned on the longitudinal axis of the runway at the normal to the bistatic axis $1_i$-$2_i$. The situation is similar with the signals emitted by the modules $1_{i-2}$ and $1_{i+2}$ received respectively by the modules $2_{i+2}$ and $2_{i-2}$. If the aircraft follows the longitudinal axis of the runway P, the signals emitted by the successive emitting modules $1_{i-1}$, $1_i$ and $1_{i+1}$ respectively received by the modules $2_{i-1}$, $2_i$ and $2_{i+1}$ have identical characteristics of cross section RCS at different instants being measured by the analyzer 362 for deriving therefrom with accuracy the speed of the aircraft.

Figure 6:
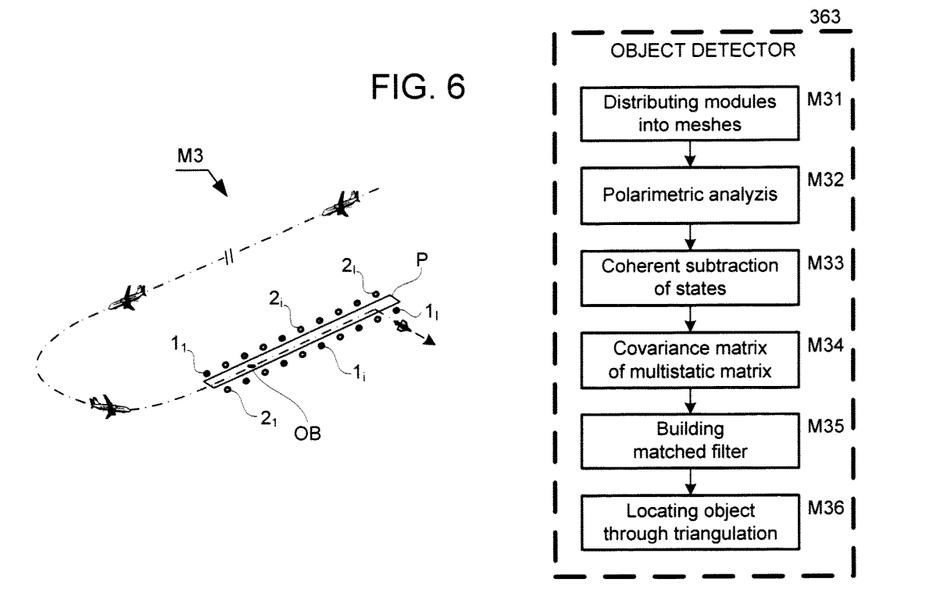
FIG. 6 shows positions of aircrafts and of an object on the runway and steps of a mode of detection of an object on the runway according to the monitoring method of the present disclosure.

The object detector 363 checks the runway for the object-detecting mode M3, normally after the runway P has been cleared by an aircraft. With reference to FIG. 6, the mode M3 includes steps M31 to M36.

Figure 9:
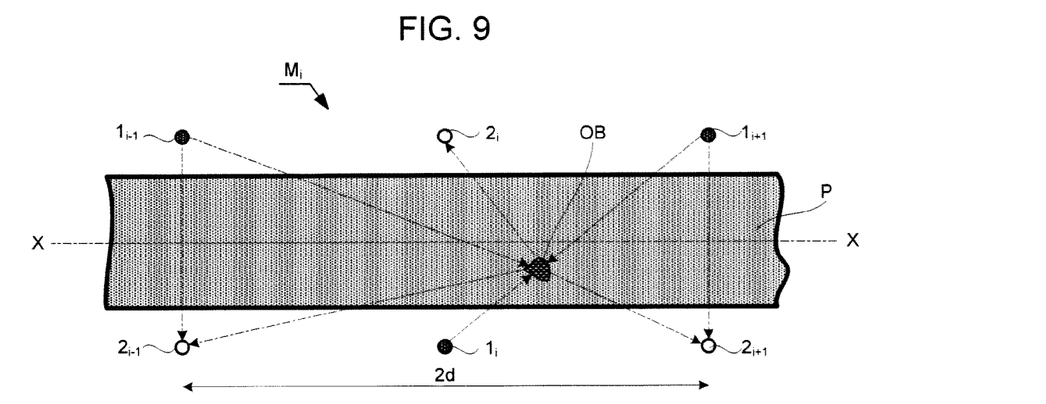
FIG. 9 illustrates a detail of FIG. 1 showing a location of an object on the runway in a mesh.

At step M31, the detector 363 distributes the emitting modules $1_1$ to $1_I$ and the receiving modules $2_1$ to $2_I$ arranged alternately on two parallel lines of the runway P in I–2 meshes superposed two to two to be used for locating an object OB on the runway as shown on FIG. 9 and in the same manner as for the mode M2, each mesh $M_i$ including three pairs of emission and receiving modules $1_{i-1} 2_{i-1}$, $1_i$-$2_i$ and $1_{i+1} 2_{i+1}$ having bistatic axes perpendicular to the runway and successively located along the runway, with 1<i<I. At least three amongst the nine bistatic pairs of emission and receiving modules belonging to the mesh $M_i$ are used for locating through triangulation at the final step M36 in conjunction with the coherent reception at least one object OB, such as an aircraft fragment, in the mesh $M_i$ on the runway. The triangulation in the mesh is relative to the signals emitted by the three emitting modules of the mesh $M_i$ and received by one of the receiving modules in the mesh. Three triangulations respectively with respect to the signals received by the three receiving modules refine the location of an object in the mesh.

As for the mode M2, the detector 363 ignores through filtering, for each receiving module $2_i$, the signals emitted by the emitting modules remote from the receiving module $2_i$ by more than the double $2d$ of the distance between two successive modules, such remote emitting modules having no sufficient energy balance. Each emitting module $1_i$ emits signals at close frequencies, different at the most of a few hundreds of hertz (FIG. 3), the beat frequencies of which at the level of a targeted object are detected and analyzed by the detector 363 in the signals received by the modules $2_{i-1}$, $2_i$ and $2_{i+1}$ of the mesh $M_i$ for accurately locating the object OB on the runway. As each emitting module includes three antennas with a double cross-polarization, the mesh $M_i$ includes 3×3 emission points and 3 reception points globally making up an interferometer having a large base between the three receiving modules and 27 degrees of freedom implemented by the detector 363 for radio locating the object OB.

For a bistatic radar pair of emitting module and receiving module remote of $D_{ER}$ and a target having $\sigma$ as a equivalent radar cross section RCS and located at a distance $D_{ET}$ from the emitting module and a distance $D_{TR}$ from the receiving module, the ratio of the power $P_T$ received via the target on the power $P_{ER}$ received in direct path from the emitting module to the receiving module is given approximately by the following formula ignoring antenna gains and propagation losses:

$$P_T/P_{ER} = \sigma D_{ER}^2/(4\pi D_{ET}^2 D_{TR}^2).$$

Based on this formula, for example for an object OB with an equivalent radar cross section σ equal to 0.1 m² located on a runway with a width WP=50 m, a distance d=150 m between emitting modules and receiving modules and a distance of 130 m between the parallel lines LG and LD of the modules, it is shown that on the ground the mesh $M_i$ includes for example only 5 bistatic pairs $1_{i-1}$-$2_{i-1}$, $1_{i-1}$-$2_{i+1}$, $1_i$-$2_i$, $1_{i+1}$-$2_{i-1}$ and $1_{i+1}$-$2_{i+1}$ with a dynamics lower than 60 dB, and all the bistatic pairs of the mesh have a dynamics lower than 70 dB. Such examples show that the object detector 363 should reject by at least 70 dB the coupling level of the direct path from each bistatic pair for detecting the smallest objects, the echoes of which are able to be masked by echoes of larger objects. This leads to secondary lobes of reception antennas having a sufficient power for detecting small dimension objects.

Preliminarily to the radiolocation M36 of the object through triangulation, the mode M3 includes the following received signal processing steps M32 to M35 that can be duplicated at least for some of them in the running analyzer 362. For reaching the rejection of the coupling through direct path for each bistatic pair of emitting module and receiving module in the mesh $M_i$ and providing filtered signals essentially containing signals backscattered by small objects to be detected on the runway, the object detector 363 cumulates coupling reductions according to three following processings of the signals received by each of the three receiving modules of the mesh.

A first processing M32 in a preliminarily calibrated polarimetric analyzer consists in implementing the linear polarization diversity of the signals emitted by the emitting modules and accordingly the polarizations of the signals received in a receiving module through backscattering of the emitted signals. The polarimetric analyzer for each bistatic module pair in a mesh $M_i$ combines the horizontal and vertical components of the signals received by the receiving module of the pair for the K/2 frequencies of the signals emitted with the horizontal polarization of the emitting module of the pair and in parallel combines separately the horizontal and vertical components of the signals received by the receiving module of the pair for the K/2 other frequencies of the signals emitted with the vertical polarization of the emitting module of the pair. The polarimetric analyzer analyzes the amplitude of the K horizontal and vertical components combined so as to minimize the direct path coupling between the emitting module and the receiving module of the pair at times of high power. Indeed the power of the direct path signal is high with respect to that of the useful signal reflected by an object. The linear polarization diversity of the emitted signals thereby imparts a large sensitivity for the detection of an object with a small reflectivity.

A second processing M33 consists in a detection of change of the coherent subtractive type increasing the object detection sensitivity. Preliminarily upon each of the cyclic learning phases, the object detection mode M3 is selected in the unit 36 so that the object detector 363 transmits a reference state of the runway cleared of any object and aircraft to the management server 42, which stores it. Such a pre-stored reference state includes more specifically the amplitudes and phases of the I×K emitted signals and the I²×K received signals. Upon implementation of the mode M3 at step M33, at each integration period, the object detector 363 reads in the server 42 the refreshed reference state and coherently subtracts it from the current state of the runway derived from the processing of the signals received by the receiving modules at least when the running analyzer 362 cyclically notifies, for example at the most every minute, a clearance of an aircraft from the runway, or when the trajectography processor 361 notifies a take-off of an a aircraft or an imminent terminal approach of an aircraft. If the comparison shows at least one intrusive object on the runway, the detector 363 transmits an alarm to the interface MMI 4 in the control tower 4. The detector 363 distinguishes three states of the runway: runway not cleared from a running target, runway cleared by a running target and runway cleared from any suspect object. This second processing through detection of a coherent change is comparable to a coherent difference of echoes in a synthetic aperture radar SAR.

A third processing M34-M35 is a processing with a spatial high-resolution of the Capon type so as to attenuate any interference signal due to the direct path between the modules of the 9 bistatic pairs in each mesh. It relates directly to the interferometric multistatic matrices associated with the meshes. Upon the learning phase, the object detector 363 converts the matrix of each mesh for each given polarization, either horizontal or vertical, in the shape of a column vector with 9×9=27 elements corresponding to the received signals of the nine bistatic pairs of emission and receiving modules in the mesh, namely the vector at the instant t for a given polarization:

$$S(t) = [s_{i-1,1+dk,j-1}, \ldots s_{i,1,j}, \ldots s_{i,K/2+dk,j} \ldots, s_{i+1,K/2+dk,j+1}]^t,$$

with i−1≤i, j≤i+1 and dk=0 or dk=K/2.

Afterwards, the detector 363 forms at step M34, through integration for a predetermined duration T, for example every 0.1 s, the covariance matrix:

$$R_{SS} = \langle S\, S^t \rangle = \int_0^T S\, S^t\, dt.$$

Furthermore, the directional vector with 27 elements associated with a candidate targeted object OB, positioned in M(x,y) is of the shape:

$$D(t,x,y) = [\ldots (D_{i,k,j}(x,y))\ldots]^t$$

with:

$$D_{i,k,j} = \alpha(M) \exp\{-j2\pi f_{i,k}[t-(1_iM+2_jM)/c] + \phi_{i,k,j}\}$$

where $\phi_{i,k,j}$ is a predetermined initial phase upon a calibration of the radar system. At step M35, the detector 363 digitally builds a matched filter for filtering the signals received by the receiving modules of the mesh. The transfer function of the digital matched filter is of the shape for the given polarization:

$$h(t) = D^H R_{SS}^{-1} S / (D^H R_{SS}^{-1} D),$$

where H is the complex conjugate transpose operator and −1 is the inverse operator.

According to other embodiments, instead of separating the signals received in the receiving modules as a function of numerous frequencies $f_{i,k}$ by the spectrum analyzer 360. the signals emitted by the emitting modules support orthogonal codes for separating the contributions of the emitted signals upon the processing of the signals received by the receiving modules in an orthogonal signal decoder in input to the processing unit 36.

For example, the emitted signals are signals of the OFDM Orthogonal Frequency Division Multiplex type. Each emitting module emits sub-carriers on K different frequencies common to the emitting modules. K/2 sub-carriers have a first polarization and K/2 other sub-carriers have a second polarization orthogonal to the first polarization. The sub-carriers emitted by the emitting module support a respective code different from the codes allocated to the other emitting modules, the codes being with several phase states and/or amplitude states.

The present method, system and device relate to a method for monitoring targets, including targets at the level of the ground on a runway, and a radar system for implementing the method. In one implementation, the steps of the method of the present disclosure are determined by the instructions of a computer program incorporated into the system.

The invention claimed is:

1. A method for monitoring targets on a runway by means of emitting modules and receiving module, wherein said emitting modules and said receiving modules are alternately distributed along each one of longitudinal sides of said runway and in that it includes emitting orthogonal signals by said emitting modules at a rate of at least two orthogonal signals per emitting module, receiving signals in said receiving modules coherently with emitting orthogonal signals by said emitting modules, and detecting an object on said runway based on a distribution of said modules into meshes each including three neighbor bistatic pairs of emitting module and receiving module and on a radio location of said object through triangulation and interferometry in at least one mesh.

2. A method according to claim 1, including emitting signals in part at a first linear polarization and in part at a second linear polarization orthogonal to said first polarization from each emitting module, and detecting an object includes periodically for each bistatic pair of emitting module and receiving module in a mesh, a polarimetric analysis of components according to said first and second polarizations of the signals received by said receiving module of said each bistatic pair and issued from the orthogonal signals at said first and second linear polarizations emitted by said emitting module of said each bistatic pair.

3. A method according to claim 1, wherein detecting an object includes periodically for each mesh, coherently subtracting a pre-stored free state of said runway from a current state of said runway derived from a processing of the signals received by said receiving modules of said each mesh.

4. A method according to claim 1, wherein detecting an object includes periodically for each mesh, determining a covariance matrix of an interferometric multistatic matrix of the signals received by said receiving modules in said each mesh and building a matched filter depending on said covariance matrix for filtering the received signals by said receiving modules in said each mesh.

5. A method according to claim 1, including analyzing a target moving on said runway, based on the distribution of said modules in the meshes, on a periodic analysis of the signals received by a front part of each receiving module through said runway, and on a periodic measurement of the variation of the efficient radar cross section of said target moving on said runway in the vicinity of bistatic axes of three pairs in a mesh substantially concurrent at the centre of said mesh.

6. A method according to claim 1, including monitoring a trajectography for an air target in the surroundings of the runway based on a periodic location of said air target through a multistatic interferometry of the signals received by said receiving modules in a three dimension space corresponding to the coordinates of the position of said air target by ignoring the Doppler effect, and through a combination of a processing of a multistatic matrix of said received signals and of the diversity of the Doppler effect.

7. A method according to claim 1, wherein the emitted orthogonal signals have different frequencies.

8. A system for monitoring targets on a runway by means of emitting modules and receiving modules, wherein said emitting modules and said receiving modules are alternately distributed along each one of the longitudinal sides of said runway, said emitting modules being able to emit orthogonal signals at a rate of at least two orthogonal signals per emitting module, and in that the system includes means for receiving signals in said receiving modules coherently with the emission of signals by said emitting modules, and means for detecting an object on said runway based on a distribution of said modules in meshes each including three neighbor pairs of emitting module and receiving module and on a radio location of said object through triangulation and interferometry in at least one mesh.

9. A system according to claim 8, including means for analyzing a target able to move on the runway based on the distribution of said modules in the meshes, on a periodic analysis of the signals able to be received by a front part of each receiving module through said runway, and on a periodic measurement of the variation of the efficient radar cross section of said target able to move on said runway in the vicinity of bistatic axes of three pairs in a mesh substantially concurrent at the centre of said mesh.

10. A system according to claim 8, including means for monitoring a trajectography of an air target in the surroundings of the runway based on a periodic location of said air target through a multistatic interferometry of the signals able to be received by said receiving modules in a three dimension space corresponding to the coordinates of the position of said air target by ignoring the Doppler effect, and through a combination of a processing of a multistatic matrix of said received signals and of the diversity of the Doppler effect.

11. A system according to claim 8, including centralized means for transmitting via optical fibers signals to be emitted by said emitting modules and for receiving via optical fibers signals to be received by said receiving modules.

12. A computer program adapted to be implemented in a system for monitoring targets on a runway by means of emitting modules and receiving modules, comprising instructions which, when the program is executed in the system, carry out receiving signals in said receiving modules coherently with emitting orthogonal signals emitted by said emitting modules, at a rate of at least two orthogonal signals per emitting module, said emitting modules and said receiving modules being alternately distributed along each one of the longitudinal sides of said runway, and detecting an object on said runway based on a distribution of said modules into meshes each including three neighbor pairs of emitting module and receiving module and on a radio location of said object through triangulation and interferometry in at least one mesh.

* * * * *